US008149690B1

(12) United States Patent
Kakkar

(10) Patent No.: US 8,149,690 B1
(45) Date of Patent: Apr. 3, 2012

(54) ELIMINATION OF BAD LINK STATE ADVERTISEMENT REQUESTS

(75) Inventor: Nitin Kakkar, Campbell, CA (US)

(73) Assignee: Force10 Networks, Inc., San Jose, CA (US)

( * ) Notice: Subject to any disclaimer, the term of this patent is extended or adjusted under 35 U.S.C. 154(b) by 454 days.

(21) Appl. No.: 12/322,979

(22) Filed: Feb. 10, 2009

(51) Int. Cl.
*H04L 12/26* (2006.01)

(52) U.S. Cl. ........................................................ 370/219

(58) Field of Classification Search .................. None
See application file for complete search history.

(56) References Cited

U.S. PATENT DOCUMENTS

| | | | |
|---|---|---|---|
| 6,757,258 B1 * | 6/2004 | Pillay-Esnault | 370/254 |
| 6,985,959 B1 * | 1/2006 | Lee | 709/238 |
| 7,035,202 B2 * | 4/2006 | Callon | 370/216 |
| 7,126,921 B2 * | 10/2006 | Mark et al. | 370/242 |
| 7,174,387 B1 * | 2/2007 | Shand et al. | 709/238 |
| 7,724,655 B2 * | 5/2010 | Saleh et al. | 370/228 |
| 7,804,770 B2 * | 9/2010 | Ng | 370/219 |
| 7,830,820 B2 * | 11/2010 | Duke et al. | 370/254 |
| 2002/0064132 A1 * | 5/2002 | Akyol et al. | 370/250 |
| 2003/0123457 A1 * | 7/2003 | Koppol | 370/400 |
| 2004/0136371 A1 * | 7/2004 | Muralidhar et al. | 370/389 |
| 2004/0156310 A1 * | 8/2004 | Fredette et al. | 370/216 |
| 2004/0261116 A1 * | 12/2004 | Mckeown et al. | 725/109 |

OTHER PUBLICATIONS

Moy, J., OSPF Version 2, RFC2328, Apr. 1998.*

* cited by examiner

*Primary Examiner* — Ayaz Sheikh
*Assistant Examiner* — Faiyazkhan Ghafoerkhan
(74) *Attorney, Agent, or Firm* — Haynes and Boone, LLP

(57) ABSTRACT

A link-state protocol running on a router requires that an adjacent neighbor router in the same network maintain a synchronized link state database in order to form the adjacency. Should the neighbor request link state information that the router does not possess, normally the adjacency is broken, causing a restart and network instability. The described embodiments allow adjacencies to form and be maintained even when the neighbor makes at least some types of "bad" requests for link state information. Embodiments that operate with and without the knowledge and cooperation of the neighbor are described.

21 Claims, 3 Drawing Sheets

ELIMINATION OF BAD LINK STATE ADVERTISEMENT REQUESTS

BACKGROUND

1. Field of the Invention

The present disclosure relates generally to link state protocols, and more particularly to systems and methods for preventing router adjacencies from failing due to bad link state advertisement requests.

2. Description of Related Art

In a packet network, "nodes" or "routers" share network topology and reachability information that allows each node or router to forward packets toward their respective destination networks. For networks defined using the Internet Protocol, each node is provisioned with a network address that identifies the particular network the system is on, and with a system or host address that uniquely identifies the node. These addresses are advertised among neighboring nodes to allow each router to build a "tree" with itself as the root node and next-hop paths from itself to every address on the network.

Routers use IP addresses to forward routed traffic on a packet network according to a routing protocol. Some common routing protocols in use today include Open Shortest Path First (OSPF), Intermediate System to Intermediate System (IS-IS), and Border Gateway Protocol (BGP). OSPF is further described in Internet Engineering Task Force (IETF) Request for Comments (RFC) 2328, "OSPF Version 2," by J. Moy, April 1998, and IETF RFC 2740, "OSPF for IPv6," R. Coltun, December 1999, both of which are incorporated herein by reference. IS-IS is further described in the International Organization for Standardization (ISO) document ISO 8473, "Intermediate System to Intermediate System Routing Information Exchange Protocol for Providing the Connectionless-mode Network Service," ISO/IEC10589:2002, $2^{nd}$ Ed., which is incorporated herein by reference. BGP is further described in IETF RFC 4271, "A Border Gateway Protocol 4 (BGP-4)," by Y. Rekhter et al., January 2006, and is incorporated herein by reference.

OSPF and IS-IS are examples of link-state protocols. A "link" can be considered to be an interface or port on a router (although some such protocols can be used to distribute other information). The state of that link contains a description of the interface and what routers/networks are reachable through that link. In OSPF, a link-state database contains the IP address of the interface/device, the subnet mask (which indicates what portion of an IP address is the network address) and other information describing the network, a list of routers connected to that network, a cost of sending packets across that interface, etc.

OSPF routers use link-state advertisements (LSAs) to share information from their link-state databases with neighboring routers in the same autonomous system. For instance, FIG. 1 shows two network areas, A0 and A1, in an autonomous system (AS) 100. Routers R1, R2, and R3 are linked in network area A0. Routers R3, R4, and R5 are linked in network area A1. Whenever an interface is brought up or a change in routing information known to one of the routers occurs, the router generates a LSA to inform its neighbors of the new or changed link-state information. When a neighbor router receives the LSA, it updates its own link-state database and then propagates the information in another LSA to its other neighbors. Thus the LSA is flooded to all routers in the same network area, and all routers in the same area contain the same link-state database. An area border router (ABR) such as R3 can have interfaces in multiple areas of an autonomous system, with different link-state databases synchronized to each area. Router R3 will generally choose to summarize information from one area for presentation to the other area.

The routers in an AS generate LSAs of various types, depending on their location in the AS. A Type 1 LSA contains information specific to the area to which the interface belongs, and is flooded throughout the area. A Type 2 LSA describes a set of routers attached to a particular network, and is also flooded to the area containing the network. Type 1 and type 2 LSAs are OSPF internal routes.

Type 3 and type 4 LSAs contain summaries of routes in a different area (inter-area routes) reachable through an ABR. An ABR generates a type 3 LSA in an area to advertise a route to a network in another area but reachable through the ABR. For instance, R3 would generate a type 3 LSA in area 0 to advertise the network in area 1 that contains R4 and R5. An ABR generates a type 4 LSA to advertise a route to an ASBR (an autonomous system boundary router, which provides routes outside of the AS) in another area.

Type 5 and type 7 LSAs describe routes external to the AS. An ASBR generates type 5 LSAs to redistribute routes received from another AS or another routing protocol. External routes are flooded throughout the AS, except for stub areas, which by definition do not receive type 5 LSAs. A type 7 LSA advertising an external route can, however, be generated using an ASBR in a Not So Stubby Area (NSSA). The NSSA propagates the type 7 LSA internally. An ABR converts the LSA to a type 5 LSA at the area boundary. LSAs of each of these types are used to synchronize the link state databases in each area of an AS.

FIG. 2 shows an exchange of OSPF protocol packets used to form an adjacency between two nodes, e.g., nodes R1 and R2 in FIG. 1. Initially, the state of the adjacency is DOWN. One of the nodes (in this example R1) begins the OSPF exchange by sending an OSPF Hello packet to the other (R2 in this example). R2 receives the hello, moves the link connecting R2 to R1 to an INIT state, and sends a return Hello packet to R1, acknowledging the Hello packet from R1.

The two routers next begin a database exchange process. One of the routers is determined to be the master (in this case R2) for a Database Description exchange during the exchange start (EXSTART) process. The slave router R1 in this example first enters the EXSTART state, and sends a first database description packet, with a sequency number y, to the master router R2. The master router discovers that it is to be the master, ignores database description packet y, enters the EXSTART state, and sends a first database description packet, with sequence number x, to R1. The database description packet contains link state advertisements (LSAs) for routes contained in R2's link state database. Each LSA indicates the LS age (the age since the advertisement was originated), the LS type, the LS ID (an IP address or other identifier), the identity of the router that originated the LSA, a checksum, and a LS sequence number, used to distinguish older/newer advertisements for the same LS ID.

The slave router R1 returns a database description packet with the same sequence number x (it must return a database description packet each time it is sent one), containing LSAs from its link state database. This process continues, e.g., for n+1 exchanges, until both routers indicate that they have no more routes to advertise. When one router finishes before the other, it continues to send empty database description packets until the other finishes.

Each router compares the LSAs it receives to the contents of its database. If any of the items in its local database have a lower sequence number than an LSA with the same LS ID, or are missing from the local database, the router requests a link state update from its neighbor. In the FIG. 2 example, it is assumed that R1 did not advertise anything that R2 did not already know about. Consequently, R2 enters a FULL state immediately after the exchange process and considers an adjacency to have been formed with R1. R1, however, identifies items that it needs from R2's database, and creates a list of LSAs corresponding to these items. R1 enters a LOADING state, in which it builds link state request packets (LSRs) containing LSAs from the list and transmits these to R2. R2 responds with link state update packets, which contain a full description of the requested link state items. This exchange continues until R1 exhausts its list, at which time it also enters a FULL state and considers the adjacency to be formed. It is also noted that R1 can issue an LSR at any time, even during the database description exchange, to receive full LSA information for items advertised by its peer.

BRIEF DESCRIPTION OF THE DRAWINGS

The present invention can be best understood by reading the specification with reference to the following Figures, in which.

DETAILED DESCRIPTION

When two routers are attempting to form an adjacency or are adjacent, the link state databases are supposed to become synchronized or are synchronized. Should one of the routers issue an LSR containing an LSA that is not in the other router's database, this causes a bad link state request event, as there is no way to obtain synchronization—the first router believes the second has advertised something that is not in its database. The router detecting the bad link state request event flushes its LSA request and response lists, terminates adjacency formation, and starts over in an attempt to reform the adjacency. This delays convergence of the network and places loads on the network and its nodes. In some cases, the cause of the problem may prevent an adjacency from ever forming, or cause sporadic convergence problems.

It has now been discovered that several alternate methods can be used to form and maintain an adjacency even when one of the routers involved issues a "bad" LSR. These methods respond to a bad LSR with a link state update that parrots the LS ID of the request, but does not contain valid link state data. The link state update is formed, however, in a manner that is essentially benign to the adjacency. This allows an adjacency to form despite an event that in the prior art would have caused a restart, improving convergence time and reducing network and computational loads.

Several reasons can cause the occurrence of a bad LSR. One overarching reason is that the router receiving what it thinks is an erroneous LSR did actually advertise at some point in the past that it possessed the requested data, but the router aged out the information, lost the information due to an internal failover, the advertised interface changed its type, etc. Further, OSPF is now used to pass auxiliary information that is not strictly routing specific. Some of this information can be highly dynamic, and/or will not cause routing loops if synchronization is not attained. Auxiliary information can also be used to implement proprietary features for one equipment vendor—although the vendor desires to synchronize each of its routers with this information, routers in the network from other vendors need not or should not receive this information. Thus a router may initially advertise the information to all neighbors, but not want to provide the underlying information to the requesting router, depending on its identity.

Figure 1:
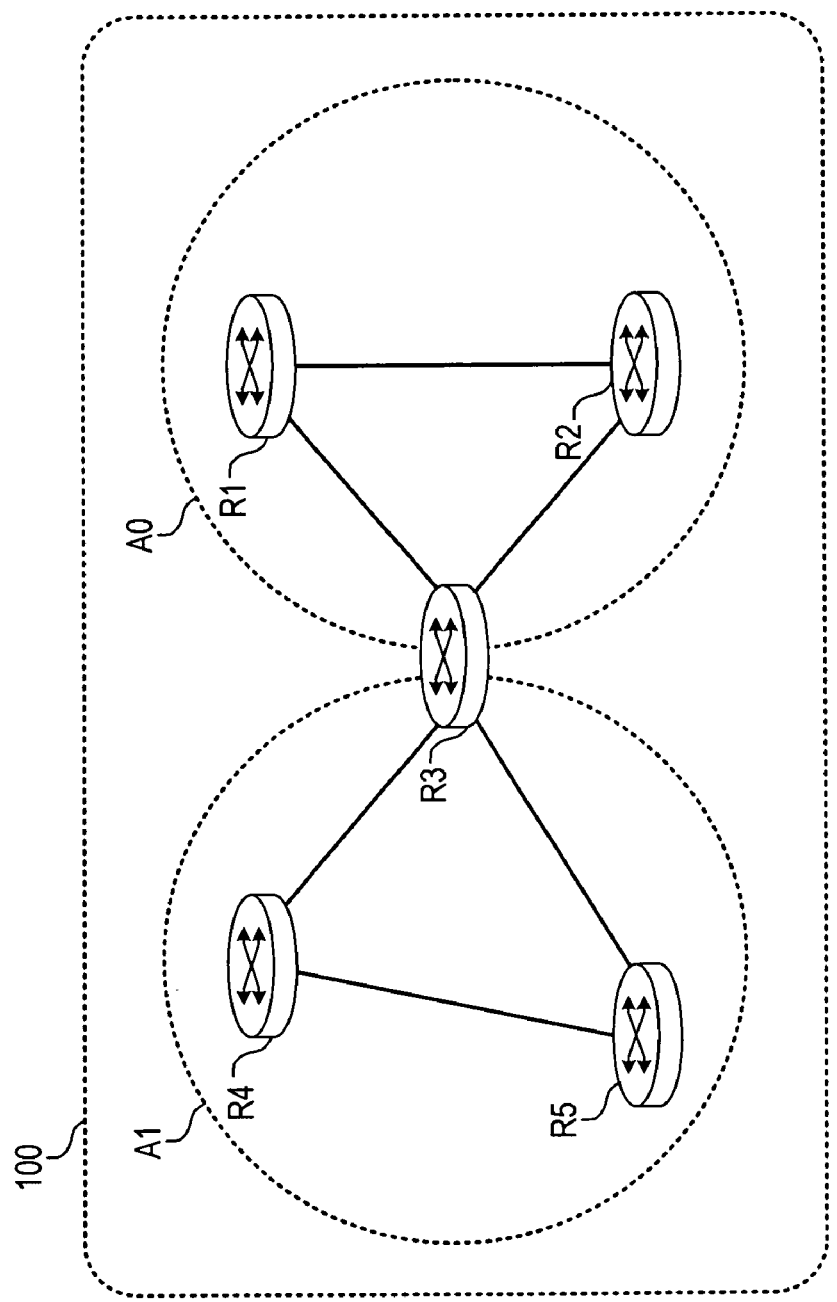
FIG. 1 illustrates a prior art network configuration for an exemplary OSPF autonomous system.
Figure 2:
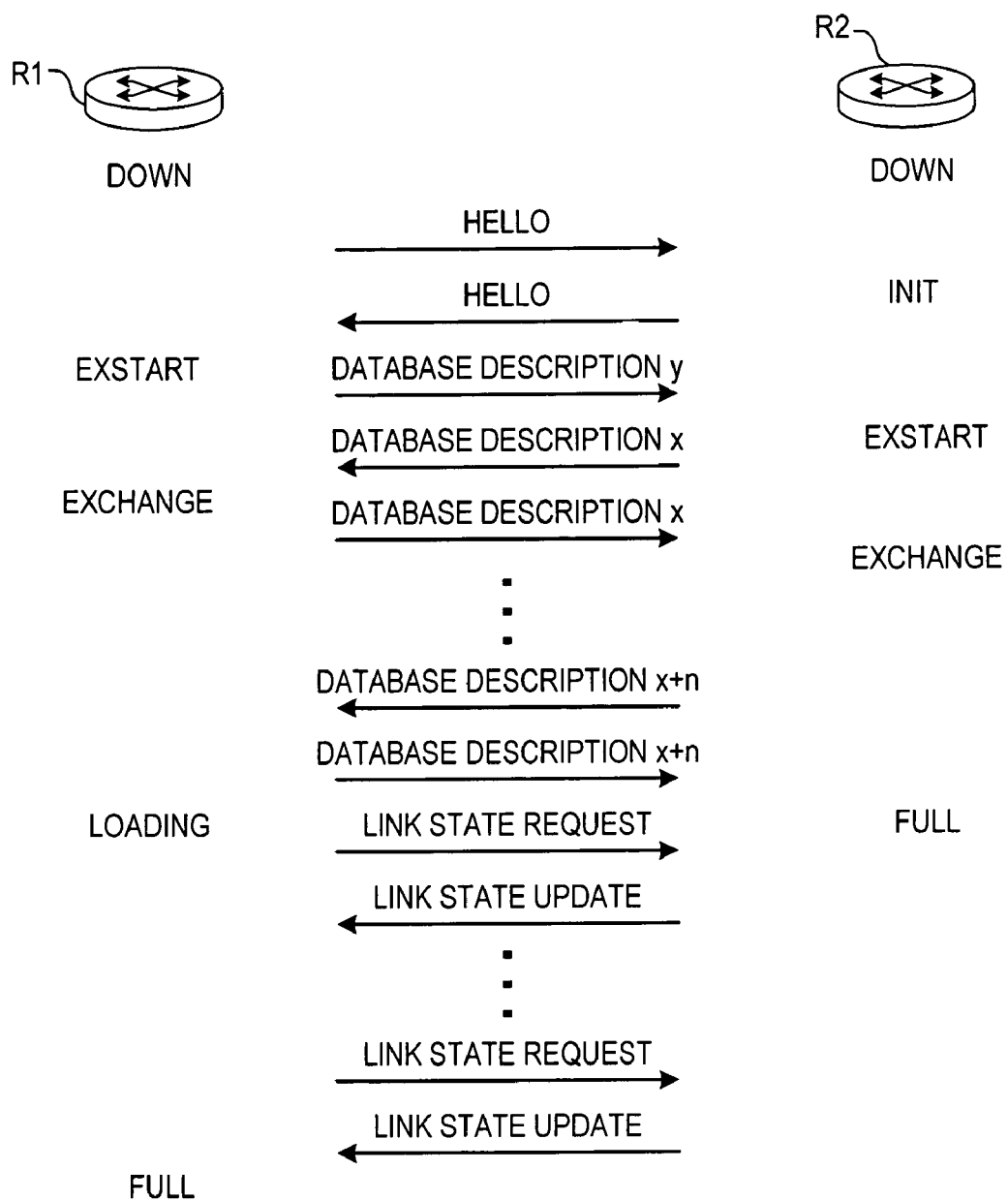
FIG. 2 illustrates a prior art link state adjacency formation process.
Figure 3:
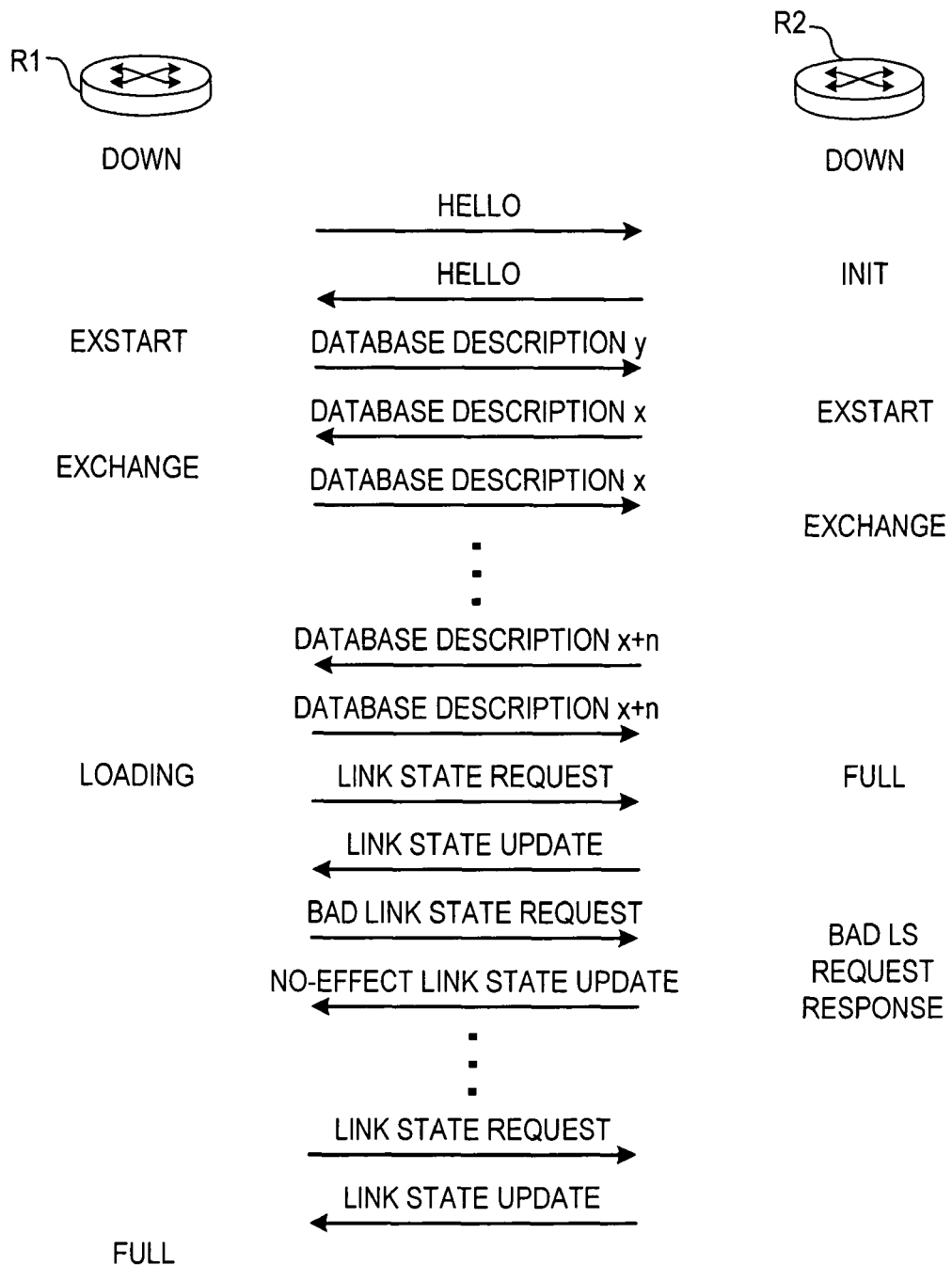
FIG. 3 illustrates a link state adjacency formation process according to an embodiment.

FIG. 3 illustrates an exemplary exchange according to an embodiment. Like in FIG. 2, routers R1 and R2 provide their database descriptions, and R1 begins making LS requests. At some point R1 issues a bad link state request, causing R2 to enter a bad LS request response state. This state selects the appropriate response to the bad link state request, in this case issuing a no-effect link state update back to R1. Some events, as will be described in more detail below, may cause R2 to determine that R1 is hopelessly lost and terminate the adjacency.

In one embodiment, the router receiving the bad LSR event constructs a no-effect link state update that has no outward identification as such, and returns the update to the requesting router. In the current OSPF format, there is no standardized way to communicate intent to not fulfill a link state request, other than to bring down the adjacency. Thus to maintain compatibility with legacy OSPF implementations, the no-effect link state update appears to be a valid LSA. Two settings, however, insure that the LSA will have no effect. These are the settings for the LS age and the LS sequence number.

The LS sequence number reflects how recently the advertisement was formed. In OSPF, the LS sequence number is a signed 32-bit integer, with higher numbers representing newer advertisements. Thus a new advertisement is assigned a sequence number 0x80000001 (where 0x represents hexadecimal notation), and subsequent reissues of the sequence number will increment until they reach 0x7fffffff—an advertisement reaching this sequence number will be prematurely aged (as described below), allowing the advertisement to wrap back to the starting sequence number. To form a no-effect LSA, a router sets the LS sequence number to 0x80000001. Any router receiving this advertisement, as well as one with any higher sequence number, will consider the other advertisement to be newer and prefer the other advertisement.

The case still exists where an actual advertisement exists from another router, but with the same minimum sequence number. The router forming the no-effect LSA can avoid having the LSA selected by making the no-effect LSA appear older than any real LSA. This can be done with the second setting, for LS age.

The LS age reflects the time in seconds since the LSA was originated. In OSPF, the LS age is transmitted as a 16-bit unsigned integer, with an allowable range between 0 and MaxAge (typically set to 3600 seconds). When two advertisements are compared, and one is of age MaxAge, the one of age MaxAge is preferred, as it is assumed that the originating router has purposely flooded an LSA with the age set to MaxAge in order to flush the advertisement. Thus a no-effect LSA cannot set LS age to MaxAge, or it will unintentionally flush any real advertisements from the network.

One solution is to set the LS age in the no-effect LSA to MaxAge—1. A router receiving an LSA is required to increase the LS age by a transmission time constant before installing the LSA in its database. When a router receives an LSA with age set to MaxAge—1, it will increase the age to MaxAge. Thus the special case of MaxAge transmission is avoided, but the LSA will not be installed in the receiving router's database (by definition, LSAs reaching MaxAge are not to be used in routing calculations) and will not be flooded to other neighbors. The value subtracted from MaxAge could be greater than 1, when the transmission time constant is greater than 1, for the same effect.

It is noted that OSPF only allows the originator of an LSA to modify the LSA. Although in some sense the no-effect LSA can be a modification of an LSA originated by another router (if the LSA lists another originator), in the sender's view the LSA does not even exist, and the no-effect LSA is merely an attempt to convey that information in a way that will not affect the receiver's database or any other router's database, without requiring restart of the adjacency.

In an embodiment, a router receiving a link state update with LS sequence number=0x80000001 and LS age=3599 (Maxage—1) can be set to recognize this as an intended no-effect LSA, and thus discard it with no further action. Optionally, if the neighbor receiving the no-effect LSA has received and installed from another neighbor, it can respond by sending a link state update with the correct information to the router generating the no-effect LSA.

Alternate implementations can define a validity flag in the LSA to convey that the LSA should have no effect, avoiding the need to select innocuous values for other fields in the return LSA. A router receiving an LSA with this flag set is configured to not propagate the link state update or enter it in its database. Further, the alternate implementation can supply, instead of or in addition to the validity flag, a reason code that indicates a reason why the updating packet router determined that the received LSR was erroneous. When the validity flag is omitted, one of the reason codes can equate to "no error."

The router receiving the erroneous link state request, in at least some embodiment, implements a policy that determines whether a particular erroneous link state request should or should not cause the adjacency formation to terminate. The policy can specify one or more criteria that meet an allowable erroneous LSR profile. For instance, if this is the first try to form the adjacency since the link has come up, or an adjacency has already formed between two neighbors, the profile may be more stringent as to the types or number of errors that are allowed, or the profile may not allow further errors at all. If one or more previous attempts to form the adjacency have failed since the link came up, the profile may be relaxed.

Within a given profile, the quantity and/or frequency of erroneous LSRs received from the neighbor since the EXCHANGE state was entered is tracked. Tracking may be an aggregate number, or can be broken down by type of bad request. Once one or more tracked quantities exceed thresholds specified in the profile, the adjacency can be terminated.

At least for purposes of measurement against a policy, erroneous LSRs can be classified according to type. For instance, one type of erroneous LSR is a request for link state information on a link state ID that the receiving router has never, since this particular adjacency was attempted, advertised to the requesting router. This type of error, if detectable as such, can for instance be dealt with in a strict policy that terminates the adjacency on a first occurrence, since the receiving router never did anything to lead the requesting router to believe it had the requested information.

Another type of erroneous LSR can occur when a neighbor router requests link state data that has, during this particular adjacency attempt, been advertised to the neighbor router, but is no longer valid at the time the link state request is received. In such a case, the "error" is understandable and probably caused by, or at least tolerated by, the receiving router. This type of error can be repeatedly tolerated and be the cause of a no-effect link state update.

In some embodiments, a neighbor router may request link state data that the receiving router possesses, but that the neighbor router is not authorized to receive. This appears to the receiving router as an error, as the receiving router is asking for something it cannot have. In some cases, the receiving router may have intentionally summarized the requested LSA during database description, with the intention of determining whether to actually supply the requested LSA based on the requester. For instance, vendor-proprietary information can be linked to the link state of an organizationally-unique identifier (OUI) during database description. The receiver must modify the LSA (e.g., the advertising router, LS sequence number, or checksum fields) with a private encryption key and return it in a link state request to receive the requested data. An authorized router would recognize the proprietary LSA as such. If the requested does not modify the LSA, or modifies it incorrectly, authorization is not granted and the requester receives a no-effect LSA.

Typical embodiments include machine instructions for a computer processor that implements a link-state protocol, such as OSPF or IS-IS, on a packet router. Such machine instructions are typically derived by compiling software written in a high-level language, and storing the machine instructions to some sort of computer-readable medium, such as a magnetic or optical storage medium, or volatile and/or non-volatile solid-state memory. The media may be local to the processor, accessible across a bus from which the instructions can be obtained during execution, or remote media from which instructions are loaded to local memory.

Those skilled in the art will appreciate that the embodiments and/or various features of the embodiments can be combined in other ways than those described. For instance, although OSPF has been used to describe the embodiments, the principles described herein can be used for other routing protocols. Further, processes other than routing protocols can use the principles described herein to synchronize state information while tolerating "bad" synchronization requests.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a link state routing protocol (LSRP) on a packet router, the method comprising:

receiving an erroneous link state request (LSR) from a neighbor router, the erroneous LSR requesting from the LSRP a link state update for link state data that the packet router will not provide to the neighbor router;

determining that the packet router and neighbor router can be adjacent without the packet router providing the link state data, comprises tracking erroneous LSRs from the neighbor router and allowing the present adjacency state with the neighbor router to continue until the tracked erroneous LSRs fail an allowable erroneous LSR profile; and sending, to the neighbor router as a response to the erroneous LSR, a link state update that does not contain valid link state data but allows a present adjacency state between the packet router and the neighbor router to continue.

2. The method of claim 1, wherein the erroneous LSR profile applied differs depending on whether the packet router and the neighbor router have already formed an adjacency or are attempting to form an adjacency.

3. The method of claim 1, wherein the erroneous LSR profile applied is relaxed when the packet router and neighbor router are attempting to form an adjacency, and have recently failed on a previous attempt to form an adjacency.

4. The method of claim 1, wherein the erroneous LSR profile specifies at least one of an allowable frequency of erroneous LSRs and an aggregate number of erroneous LSRs.

5. The method of claim 1, wherein the erroneous LSR profile applied differs depending on the LSR type of the erroneous LSR.

6. The method of claim 5, wherein for at least one LSR type, the erroneous LSR profile does not allow any erroneous LSRs of that type.

7. The method of claim 1, further comprising determining that the received LSR is erroneous when the neighbor router requests link state data that the packet router has not advertised to the neighbor router.

8. The method of claim 7, further comprising, when the received LSR is erroneous because the neighbor router requests link state data that the packet router has not advertised to the neighbor router, terminating the present adjacency state between the packet router and the neighbor router without sending the link state update that allows the present adjacency state to continue.

9. The method of claim 1, further comprising determining that the received LSR is erroneous when the neighbor router requests link state data that the packet router has previously advertised to the neighbor router, but the requested link state data is no longer valid at the time the link state request is received.

10. The method of claim 1, further comprising determining that the received LSR is erroneous when the neighbor router requests link state data that the neighbor router is not authorized to receive.

11. The method of claim 10, wherein the packet router has previously advertised to the neighbor router an authorization level required to receive the link state data.

12. The method of claim 11, wherein the link state data comprises auxiliary data that does not directly affect the routing of non-proprietary data packet formats across a network containing the packet router and the neighbor router.

13. The method of claim 1, wherein sending the link state update comprises, with the link state update format containing a link state identifier, a sequence number, and an age, constructing the link state update with a link state identifier, a sequence number, and an age that will cause the neighbor router to not propagate the link state update to other routers and to prefer an actual link state update, containing the same link state identifier, received from another router.

14. The method of claim 13, wherein the sequence number in the link state update format can vary over a range from lowest value to highest value, and wherein constructing the link state update comprises setting the sequence number in the link state update to the lowest value.

15. The method of claim 14, wherein the age in the link state update format can vary over a range from the youngest age to the oldest age, and wherein constructing the link state update further comprises setting the age in the link state update to one less than the oldest age.

16. The method of claim 13, wherein the age in the link state update format can vary over a range from the youngest age to the oldest age, and wherein constructing the link state update comprises setting the age in the link state update to one less than the oldest age.

17. The method of claim 1, wherein sending the link state update comprises, with the link state update format containing a link state identifier and a validity flag, constructing the link state update with a link state identifier value and with a validity flag value that will cause the neighbor router to not propagate the link state update to other routers and to prefer an actual link state update, containing the same link state identifier, received from another router.

18. The method of claim 1, wherein the link state update format comprises a reason code, and wherein constructing the link state update further comprises setting the reason code to a value indicative of a reason why the packet router determined that the received LSR was erroneous.

19. The method of claim 1, further comprising determining that the received LSR is erroneous comprises examining the received LSR to determine whether the neighbor router is authorized to receive the requested link state data.

20. An apparatus comprising a computer memory containing instructions that, when executed by one or more processors on a packet router, cause the packet router to perform a method of operating a link state routing protocol (LSRP), the method comprising:
   receiving an erroneous link state request (LSR) from a neighbor router, the erroneous LSR requesting from the LSRP a link state update for link state data that the packet router will not provide to the neighbor router;
   determining that the packet router and neighbor router can be adjacent without the packet router providing the link state data, comprises tracking erroneous LSRs from the neighbor router and allowing the present adjacency state with the neighbor router to continue until the tracked erroneous LSRs fail an allowable erroneous LSR profile; and
   sending, to the neighbor router as a response to the erroneous LSR, a link state update that does not contain valid link state data but allows a present adjacency state between the packet router and the neighbor router to continue.

21. For a first router and a second router operating as peers in a packet data network, the first and second routers synchronizing database state information according to a method comprising:
   the first and second routers maintaining respective first and second state databases;
   the first and second routers requiring that a subset of the information contained in the first and second link state databases be synchronized between the two databases; and
   at least the first router allowing the second router to request database state information outside of the subset of the information contained in the first and second link state databases, the first router responding to a request for state information outside of the subset by sending to the second router a state update that does not contain valid state information but allows a synchronization state between the first and second routers to continue, the second router recognizing that the first router has responded to the request for state information by intentionally sending a state update that does not contain valid state information, and the second router checking as to whether it has received valid state information from another source and corresponding to the same state identifier as the state update that does not contain valid state information, and sending an update to the first router containing the valid state information when such exists.

* * * * *